(12) United States Patent
Nilsson et al.

(10) Patent No.: US 7,823,446 B2
(45) Date of Patent: Nov. 2, 2010

(54) PULSED RADAR LEVEL GAUGING WITH RELATIVE PHASE DETECTION

(75) Inventors: Valter Nilsson, Hovås (SE); Fabian Wenger, Göteborg (SE)

(73) Assignee: Rosemount Tank Radar AB, Gothenburg (SE)

( * ) Notice: Subject to any disclaimer, the term of this patent is extended or adjusted under 35 U.S.C. 154(b) by 830 days.

(21) Appl. No.: 11/593,384

(22) Filed: Nov. 6, 2006

(65) Prior Publication Data

US 2008/0105048 A1    May 8, 2008

(51) Int. Cl.
*G01F 23/28* (2006.01)
(52) U.S. Cl. .................................. 73/290 V; 73/290 R
(58) Field of Classification Search ............... 73/290 R, 73/290 V
See application file for complete search history.

(56) References Cited

U.S. PATENT DOCUMENTS

| | | | | |
|---|---|---|---|---|
| 4,044,355 A * | 8/1977 | Edvardsson | ................. | 342/124 |
| 4,320,659 A * | 3/1982 | Lynnworth et al. | ............. | 73/589 |
| 4,443,792 A * | 4/1984 | Pidgeon et al. | ............. | 342/124 |
| 4,816,834 A * | 3/1989 | Bjorke | ........................ | 342/120 |
| 5,070,730 A * | 12/1991 | Edvardsson | ................ | 73/290 V |
| 5,076,384 A * | 12/1991 | Wada et al. | ................. | 180/169 |
| 5,233,352 A * | 8/1993 | Cournane | ................... | 342/124 |
| 5,369,409 A * | 11/1994 | Urabe et al. | ................ | 342/133 |
| 5,672,975 A * | 9/1997 | Kielb et al. | ................. | 324/644 |
| 6,529,568 B1 * | 3/2003 | Richards et al. | ............. | 375/346 |
| 6,631,639 B1 * | 10/2003 | Dam et al. | ................. | 73/290 V |
| 6,644,114 B1 * | 11/2003 | McEwan | ................... | 73/290 R |
| 6,650,280 B2 * | 11/2003 | Arndt et al. | ................. | 342/124 |
| 6,679,115 B2 * | 1/2004 | Heidecke | ................. | 73/290 V |
| 6,867,729 B2 * | 3/2005 | Berry et al. | ................. | 342/124 |
| 6,914,949 B2 * | 7/2005 | Richards et al. | ............. | 375/346 |
| 7,131,325 B2 * | 11/2006 | Nilsson et al. | ............ | 73/290 V |
| 7,515,896 B1 * | 4/2009 | Sorrells et al. | .............. | 455/313 |
| 2002/0109626 A1 | 8/2002 | Spanke | ........................ | 342/124 |
| 2006/0000275 A1 * | 1/2006 | Nilsson et al. | ............ | 73/290 V |
| 2008/0105048 A1 * | 5/2008 | Nilsson et al. | ............ | 73/290 V |
| 2008/0129583 A1 * | 6/2008 | Larsson et al. | .............. | 342/124 |
| 2009/0033543 A1 * | 2/2009 | Nilsson et al. | .............. | 342/124 |

* cited by examiner

*Primary Examiner*—Hezron Williams
*Assistant Examiner*—Rodney T Frank
(74) *Attorney, Agent, or Firm*—Westman, Champlin & Kelly, P.A.

(57) ABSTRACT

A method for determining a process variable of a product in a tank based on a time delay of electromagnetic waves. The method further comprises forming a measurement signal comprising a sequence of values, each value representing a time correlation between a pulse of a reference signal and a reflected signal, sampling and digitizing this measurement signal to form a digital signal, identifying a time window of the digital signal including the surface echo peak, determining a relative time period between a reference time corresponding to the predefined reference and a beginning of the time window, time-to-frequency transforming the digital signal in the time window to obtain a phase spectrum, determining a relative phase shift of the spectrum and using the relative phase shift to calculate a corresponding time shift, and determining the time delay by adding the relative time period and the time shift.

The invention is based on the realization that major improvement of measurement performance, compared to amplitude detection only, can be achieved by discrimination of the phase difference between the reflected signal and a reference. The detection is further independent of the pulse waveform and modulation, significantly reducing the requirements on pulse modulation.

18 Claims, 4 Drawing Sheets

PULSED RADAR LEVEL GAUGING WITH RELATIVE PHASE DETECTION

TECHNICAL FIELD

The present invention relates generally to a method and a radar level gauge for determining a propagation delay for a signal emitted into a tank and reflected by a surface of a content in the tank. More specifically, the invention relates to radar level gauging based on detecting relative phase delay.

BACKGROUND OF THE INVENTION

Radar level gauges are used for making non-contact measurements of the level of products such as process fluids, granular compounds and other materials. These devices utilize an antenna or a probe to transmit electromagnetic waves toward the material being monitored and to receive electromagnetic echoes which are reflected at the surface of the material being monitored. The relationship between transmitted and received waves is then used to determined the location of the reflection, i.e. the surface.

In a pulsed radar level gauge, constant power electromagnetic pulses are transmitted into the tank with a repetition frequency typically in the range 100 kHz to a few MHz. The pulses can be DC pulses or modulated by a microwave frequency carrier wave. The pulse can be guided by a wave guiding structure into the tank, or be allowed to propagate freely. On the receiver side, a reflection from the interior of the tank is received, and a low frequency analogue tank signal is formed and then digitized to form a digital time domain reflectometry (TDR) signal. The location of a surface echo is determined by identifying peaks in this TDR-signal using amplitude detection.

However, amplitude detection as the only method for identifying the location of an echo in the tank signal suffers from limitations. The reason is that the peak is in fact the envelope of a waveform, making a small shift of the waveform very difficult to detect. In order to obtain a satisfactory result, the envelope needs to have a sharp peak, leading to strict requirements for pulse modulation of the signal when relying on amplitude detection. In addition to this, the resolution of A/D converter needs to be relatively high, as limitations in system causing saturated signals may further reduce measurement performance. The situation is illustrated in FIG. 1, showing a waveform representing a reflection of a modulated pulse being slightly shifted a time δ between two locations, and the resulting, almost undetectable, difference in envelope maximum.

GENERAL DISCLOSURE OF THE INVENTION

It is an object of the present invention to relax the system requirements, and to provide an improved method for accurate detection of surface echoes in a tank signal.

According to a first aspect of the invention, this and other objects are achieved by a method for determining a process variable of a product in a tank based on a time delay of electromagnetic waves propagating between a predefined reference and a surface of the product, the method comprising:
generating a transmission signal in the form of a first pulse train,
generating a reference signal in the form of a second pulse train,
wherein each pulse in the first and second pulse trains has an essentially identical waveform,
pulses in the first and second pulse trains being delayed in relation to each other by a predefined and varying time delay,
guiding the transmission signal into the tank as electromagnetic waves, and allowing the waves to propagate towards the surface,
receiving a reflected signal reflected from the tank,
forming a measurement signal comprising a sequence of values, each value representing a time correlation between a pulse of the reference signal and the reflected signal, the measurement signal comprising at least one amplitude peak indicating a surface echo,
sampling and digitizing the measurement signal, to form a digital signal,
identifying a time window of the digital signal including the surface echo peak,
determining a relative time period between a reference time corresponding to the predefined reference and a beginning of the time window,
time-to-frequency transforming the digital signal in the time window to obtain a phase spectrum,
determining a relative phase shift of the spectrum and using the relative phase shift to calculate a corresponding time shift, and
determining the time delay by adding the relative time period and the time shift.

The invention is based on the realization that major improvement of measurement performance, compared to amplitude detection only, can be achieved by discrimination of the phase difference between the reflected signal and a reference. The detection is further independent of the pulse waveform and modulation, significantly reducing the requirements on pulse modulation.

The measurement signal represents a time correlation between the pulses of the reference signal and the reflected pulses. As will be described in the following, the theoretical approach is based on a cross correlation of the reflected signal with itself. However, as long as the pulses in the transmission signal (which will be reflected) and the pulses in the reference signal have essentially the same waveform the correlation of the reflected signal with the reference pulses will give satisfactory results. It should be noted that the actual waveform itself is not important, as long as it is the same for the transmission signal and the reference signal.

The measurement signal may be formed by mixing the two input signals such that a pulse indicating time correlation is generated each time a reference pulse passes the time domain for the reflected signal. The pulses can then be provided to a sample-and-hold circuit to form a continuous signal.

This measurement signal is then time-to-frequency transformed and the relative phase can be determined. A prerequisite is that the measurement signal is unaffected by the A/D conversion preceding the time-to-frequency transform. As will be further described in the following detailed description, this implies that it may be advantageous to remove any rectifier and envelop filter prior to the A/D converter.

The time to frequency transform is preferably a discrete Fourier transform.

The relative phase of the time window of the correlated signal will be modulus $2\pi$, and therefore the relative time period from a reference time corresponding the predefined reference to the beginning of the window is determined, e.g. by counting the number of samples in the A/D-conversion step. Note that this relative time period in principle may be zero, if the predefined reference and the beginning of the time window coincide.

In principle, the varying time delay does not need to be linearly varying. It is sufficient that a sufficient number of different time delays between corresponding pulses in the transmission signal and reference signal are provided, such that the time to frequency transform can be performed with sufficient accuracy. However, in order to simplify the processing of the digitized signal, the varying time delay is preferably linearly increasing or decreasing with time.

In a simple embodiment, the amplitude of the digitized signal is detected, and the time window is selected based on whether this amplitude exceeds a predefined threshold.

Alternatively, the time window can be selected as a time window for which the amplitude spectrum of a time to frequency transform is indicative of a surface echo. This time window can be identified by continuously (for each sample of the digitized signal) performing a time to frequency transform, and analyzing the amplitude spectrum.

The reference time can be an echo from the predefined reference, such as an echo from a transition between two wave guiding mediums in the RLG. Such a reference provides the required connection between the time scale of a measurement cycle and the actual geometry of the tank.

The relative phase shift can be determined by calculating two phase-frequency pairs each comprising the phase of the Fourier transform for a specific frequency, and determining a slope between these phase-frequency pairs. This provides an efficient way to determine the relative phase, saving processing power.

In a preferred embodiment, the first pulse train has a first pulse repetition frequency, the second pulse train has a second pulse repetition frequency, and the correlation of the reflected signal with the reference signal is such that the correlated signal represents a time expansion of one pulse of the reflected signal. This corresponds to the situation in a conventional RLG, which makes it very suitable for implementing the present invention, as will be described in the following detailed description.

BRIEF DESCRIPTION OF THE DRAWINGS

These and other aspects of the present invention will now be described in more detail, with reference to the appended drawings showing a currently preferred embodiment of the invention.

DETAILED DESCRIPTION OF CURRENTLY PREFERRED EMBODIMENTS

Figure 2:
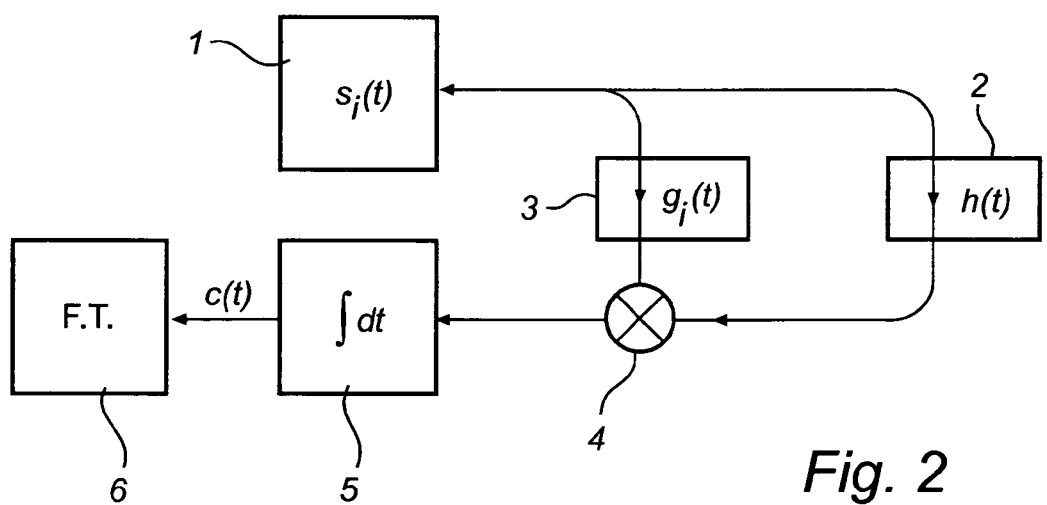
FIG. 2 is a system model of a radar level gauging system.

FIG. 2 shows a schematic model of a radar level gauging system according to an embodiment of the present invention.

A transmitter 1 produces a train of identical pulses $s_i(t)$ that is transmitted via an unknown channel 2 with impulse response $h(t)$. A copy of the transmitted pulse train is transmitted via a reference channel 3 having an impulse response $g(t)$ representing a known and varying relative time delay $t_0+\tau_i$ i.e. $g_i(t)=\delta(t-(t_0+\tau_i))$.

The two inputs are cross correlated (i.e. mixed 4 and integrated 5) to form a cross correlated signal $c(t)$ and finally Fourier transformed 6 as a function of the minimum delay $t_0$. The result out of the Fourier Transform can be written as:

$$C(\omega)=|S(\omega)|^2 H(\omega) \quad \text{Eq 1}$$

Equation 1 represents the power spectral density $|S(\omega)|^2$ of the transmitted signal multiplied with the Fourier Transform $H(\omega)$ of the unknown channel. For the special case when the unknown channel is a delayed response, $h(t)=\delta(t-t_{ch})$, the expression becomes $$C(\omega)=|S(\omega)|^2 \exp(-j\omega(t_{ch}-t_0)) \quad \text{Eq 2}$$

From this expression follows that the Fourier transform of $c(t)$ will have a linear phase proportional to the relative time delay between $t_0$ and $t_{ch}$, i.e. $t_{ch}-t_0$. Ambiguities of the phase can be resolved by taking sufficiently small frequency steps compared with the measurement range.

According to the invention, the channel delay is therefore determined by calculating the phase spectrum of the Fourier transform of $c(t)$. The slope of this line will be equal to $(t_{ch}-t_0)$.

In case of a discrete multipath channel, the amplitude measures the relative strength of the reflection (weighed with the power spectral density), while the phase is related to the delay:

$$C(\omega)=|S(\omega)|^2 \Sigma_i \eta_i \exp(-j\omega(t_i-t_0)) \quad \text{Eq 3}$$

Obviously more advanced estimation methods have to be used for this case, both the number of reflections, the reflection coefficient and delays have to be estimated.

Finally certain microwave phenomena have to be described by complex IIR Filters (skin, proximity effect etc.) with a continuous impulse response, which will be the most challenging channel estimation situation (see F. Wenger, T. Gustafsson, L. Svensson. Perturbation theory for inhomogeneous transmission lines. *IEEE Transactions on Circuits and Systems, Part I*, vol. 49, no. 3, March 2002, pp. 289-297.)

Figure 1:
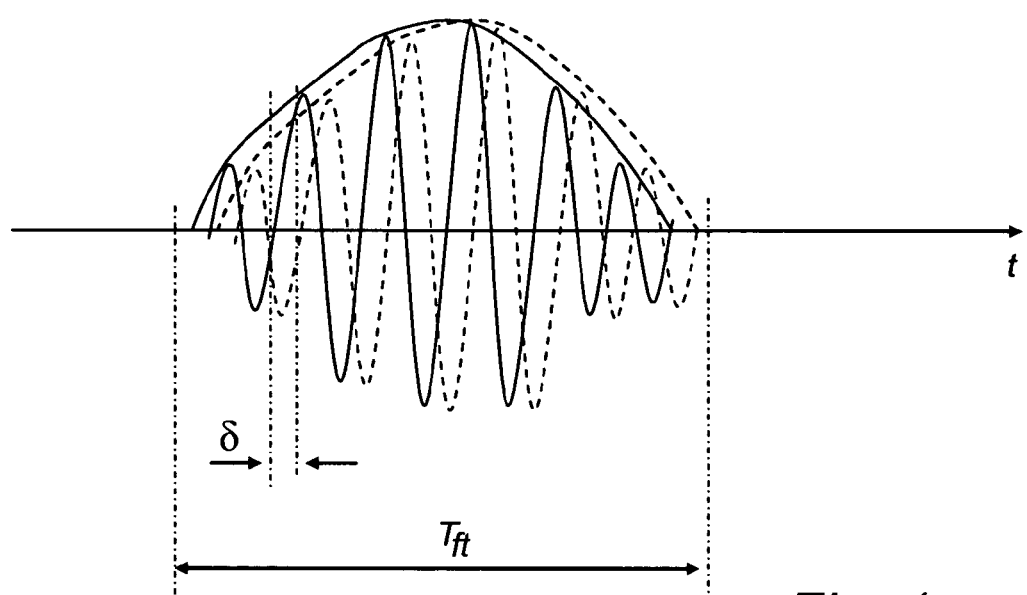
FIG. 1 is a time diagram of two reflected pulses shifted slightly in time.
Figure 3:
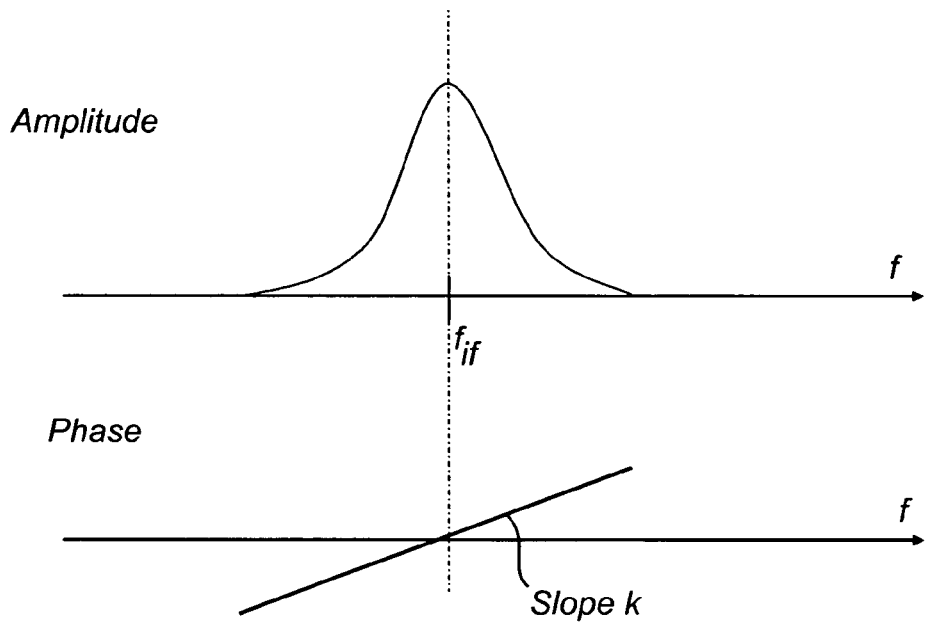
FIG. 3 is an amplitude and a phase spectrum of two signals obtained from the system in FIG. 2.

If two pulse trains are transmitted in a system according to the model in FIG. 2, with a slightly varying channel delay, the two cross correlation signals $c_1(t)$ and $c_2(t)$ of the reflected pulses will correspond to the diagram in FIG. 1. The amplitude and phase spectrum of the Fourier transform of these signals over the time window $T_{ft}$ of these signals are shown in FIG. 3. Clearly, both signals $c_1$ and $c_2$ will have identical amplitude spectrums. In the phase spectrum, the first signal, which is assigned as reference, will by definition be represented by a horizontal line (slope k=0), thus coinciding with the frequency axis. The phase spectrum of the second signal, received from a slightly larger distance, will show a linearly increasing phase $k\omega$. The slope k ($k=d/d\omega$ linear phase) will, according to equation 2, be equal to the time delay between the second signal and the first signal.

The proposed method to use cross correlation to determine a time delay between two signals may be used either to determine an increase in time delay between two signals (as in the example above) or to serve as a method to determine the total time delay of an unknown channel.

In the latter case, it is first necessary to determine where to apply the Fourier transform (where to place $t_0$, the beginning of the time window $T_{ft}$), i.e. the relative time from a fixed reference $t_{ref}$ to $t_0$ needs to be determined. The Fourier analysis of the phase spectrum will then provide the last portion of the propagation delay, $t_{ch}-t_0$, resulting in a total propagation delay (time of flight), $t_{ch}-t_{ref}$ and thus a complete measure of the location of the echo.

A more detailed embodiment of the present invention will now be described with reference to a pulsed radar level gauging system. It should be noted that the invention by no means is limited to this implementation, but that the principles outlined above, and defined in the appended claims, are equally applicable to any pulsed system, regardless of pulse waveform and modulation. For example, the pulses may be frequency modulated.

The basic principle of pulsed radar level gauging is that a radio frequency signal is allowed to propagate into a tank towards a surface (liquid or solid). A signal reflected from the surface is received, and the distance h to the surface is determined based on the time of flight. However, the distance h is generally rather short in level gauging applications (in relation to the speed of propagation), making the round trip time very short as well. This makes it virtually impossible to measure the time directly. A sample or cross correlation technique, common also in digitizing oscilloscopes, is therefore used. The output from this operation is a mapping of the input signal to an extended time scale making it possible to use common available circuits and technique to process the signal further, in order to determine the distance. A prerequisite for applying this sampling technique is that the input signal is repetitive. It should be noted that requirements for precise timing and similarity of signals from pulse to pulse (coherency) are high in order to produce stable and accurate measurements.

Figure 4:
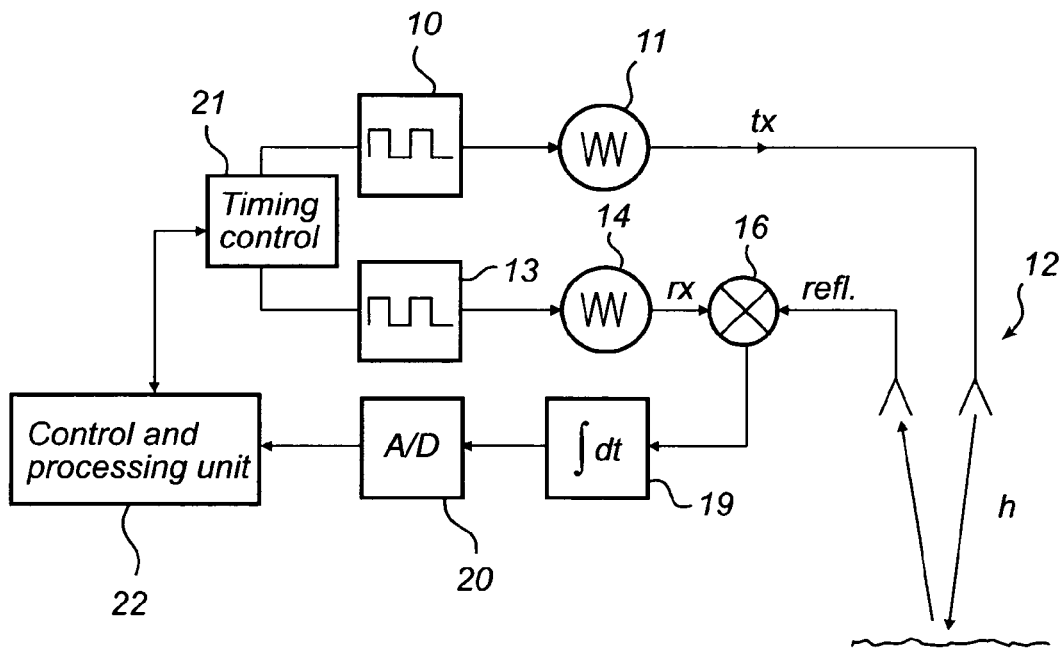
FIG. 4 is a block diagram of a pulsed radar level gauging system according to a further embodiment of the present invention.

FIG. 4 shows a simplified block diagram of a pulsed radar system 1 provided in a tank 2 containing a product 3, the level L of which is to be measured. The system comprises a pulse generator 10 connected to a modulator 11. The pulse generator 10 is adapted to generate short continuous trig pulses to cause the modulator 11 to produce a pulse train tx of short coherent RF-modulated pulses having a fixed repetition frequency, $f_{tx}$. The modulation frequency $f_{rf}$ is preferably 5-10 GHz or higher and the repetition frequency $f_{tx}$, typically some MHz. The pulses have a duration, τ, of typically less than a nanosecond up to a few nanoseconds, depending on required resolution of echoes in the system.

The modulator is connected to a propagation device 12, adapted to allow electromagnetic waves to propagate into the tank and to return electromagnetic waves reflected from the tank. The propagation device 12 can, as illustrated here, include two free radiating antennas 12a, 12b (one emitting antenna and one receiving antenna), or include only one antenna and a directional coupler allowing the one antenna to act both as emitter and receiver. Alternatively, the propagation device comprises a wave guiding probe extending into the tank. The probe can be a twin probe, a coaxial probe, or a surface guiding probe.

A second pulse generator 13 is connected to a second modulator 14, the output of which is connected to one of the input terminals 15 of a mixer 16. The other input terminal 17 of the mixer 16 is connected to the propagation device 12. The output 18 of the mixer 16 is connected to an integrator 19, such as a sample-and-hold circuit, in turn connected to an A/D-converter 20. A timing control 21 connected to a processor 22 is arranged to control the pulse generators 10, 13, and the processor 22 is also supplied with the output from the A/D-converter 20 for determining a measurement result.

The second pulse generator 13 is controlled by the timing control 21 to generate trig pulses of equal duration, τ, and essentially equal repetition frequency $t_{rx}$ as the pulse generator 10. The pulses are modulated by the second modulator 14, to provide a second pulse train rx of coherent RF-modulated pulses. The slight difference Δf in pulse repetition frequency creates a continuously increasing delay of the rx pulses from one period to the next compared to the tx pulses. The timing control 21 is monitored by the processing circuitry 22. Performance of the system relies on precise timing, free of jitter or time discontinues.

In a practical implementation the pulse generators 10, 13 each comprises a separate oscillator, where one, preferably the oscillator in the second pulse generator 13, is tunable. The timing control 21 is then adapted to control pulse generator 13 to produce a trig wave form with a fixed frequency $f_{rx}$ very close, but not identical, to $f_{tx}$. The difference in frequency Δf between $f_{tx}$ and $f_{rx}$ is typically in the range of tenths of Hz.

The choice of pulse generators 10, 13 have impact on several design aspects. Crucial is that the difference frequency Δt is selected small enough to fulfill required ranging accuracy of the system.

In use, the pulse train tx from the modulator 11 is supplied to the propagation device 12 which directs an electromagnetic signal towards the surface 4 of the product. A reflected wave, refl, is returned by the propagation device 12 and supplied to the mixer 16. Amplifiers (Low Noise Amplifiers, LNA), not shown here, could optionally be provided in front of the mixer in order to increase the sensitivity of the system.

The received signal, refl, will continuously supply the mixer with pulses at a rate equal to the repetition $f_{tx}$, but with a fixed delay, $\delta_{echo}$. This delay is the sum of internal fixed delays and round trip time for the signal to travel the distance from propagation device and back, i.e. the distance 2 h. Delays from internal distances in transmitter and receiver parts of the instrument is considered to be known, which enables discrimination of the distance.

Figure 5:
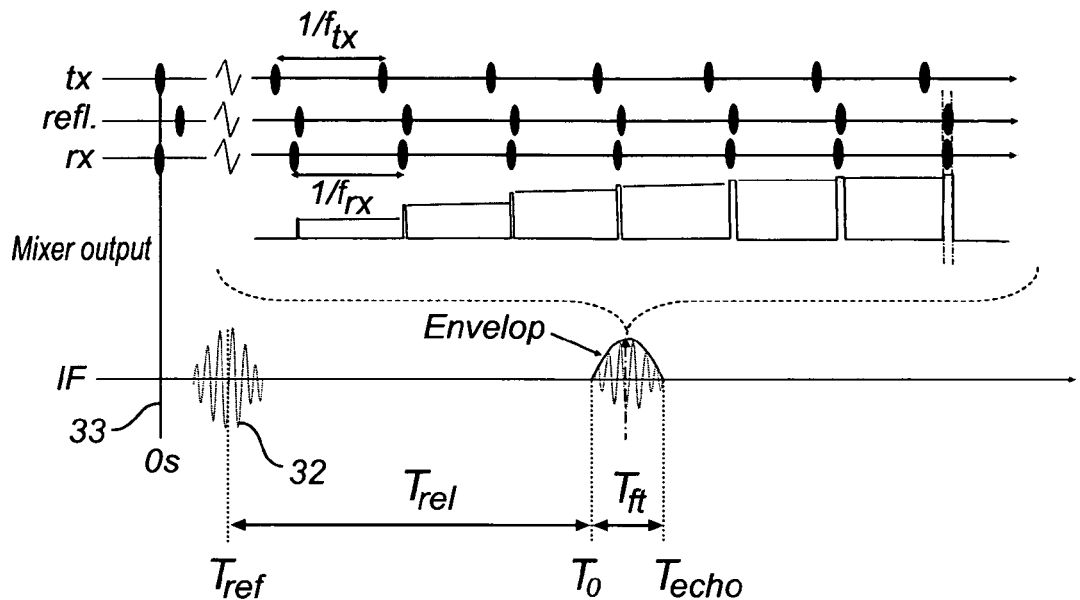
FIG. 5 is a representation of various signals in the RLG system in FIGS. 4 and 5.

The received signal $rf_{refl}$ is "sampled" in the mixer with the reference signal rx from the modulator 14. The mixer only supplies output when input signals are available simultaneously on both inputs, which happens when the continuously delayed reference signal rx passes the time domain for the received signal, refl. Each such correlation, or sample, during the passage produces a pulse proportional to the momentary product of the input signals, in this case principally a representation of relative phase between the input signals (rx and refl). The output from the mixer 16 is supplied to the sample-and-hold circuit 19, that generates a continuous analogue tank signal IF, representing a cross correlation of the signals rx and refl. The process and various signals are illustrated in FIG. 5.

One sweep is complete when the reference signal rx has shifted one period ($2\pi$, $1/f_{tx}$ seconds) with respect to tx. Consequently, one sweep consists of a large number of pulses, possibly hundreds of thousands pulses, depending on the value of the difference frequency between $f_{rx}$ and $f_{tx}$. With reference to FIG. 5, assume that one sweep starts at the instance 33 when rx and tx are in phase, at 0 s. For each pulse repetition cycle, the signal rx to the mixer is increasingly delayed as described above. The additional time delay from one pulse to the next then becomes:

$$\Delta t = \frac{1}{f_{rx}} - \frac{1}{f_{tx}} = \frac{f_{tx}-f_{rx}}{f_{tx} \cdot f_{rx}} = \frac{\Delta f}{f_{tx}(f_{tx}-\Delta f)},$$

where Δf is the difference frequency $rf_{tx}-rf_{rx}$.

The total duration of one sweep is 1/Δf, and it represents a time expansion of one reflected pulse. The IF frequency ($f_{if}$) on the expanded time scale becomes:

$$f_{if} = \frac{f_{prftx} - f_{prfrx}}{f_{prftx}} \cdot f_{rf} = \frac{\Delta f}{(f_{prftx} - \Delta f)} \cdot f_{rf} \qquad \text{Eq. 4}$$

The same relationship holds between the actual time scale and the expanded time scale:

$$\text{actual time} = \frac{\Delta f}{(f_{prftx} - \Delta f)} \cdot \text{expanded time} \qquad \text{Eq. 5}$$

In a conventional RLG system, the tank signal IF would be rectified by a rectifier and processed in an envelop filter prior to the A/D converter 20. This allows for the processing unit to determine the location of a surface echo 31 in the expanded tank signal IF using amplitude detection. The location of the surface is related to a fixed reference, normally a static echo 32 received from the near zone of the radar, which also is located in the expanded tank signal IF (see FIG. 5). The static echo 32 could be caused by an internal reflection inside the radar. If the position of the static echo is known, the position of the surface echo has now been determined, and based on the known speed of propagation of electromagnetic waves and the constant for time expansion defined above, it is possible to calculate the distance h, and in turn the level L. However, as mentioned above, amplitude detection suffers from limitations, especially for small changes in distance h.

It can be realized that the described method conventionally used to expand the time scale of the received signal in a pulsed RLG system described above, in fact corresponds to the cross correlation described in the model in FIG. 2, with the addition that the known time delay increases linearly with respect to time. It will be illustrated below that the phase delay detection outlined above can be successfully implemented in a pulsed RLG system by adapting the system and the signal processing as indicated in FIG. 4.

Returning to FIG. 4, the IF signal is directly supplied to the A/D converter 20, and the digitized signal is fed to the processing unit 22. The processor is adapted to perform a Fourier transformation of the received signal. It should be noted that the clock rate of the A/D converter 19 must support an adequate sampling rate in order to deliver an accurate representation of the IF signal to allow for Fourier transformation. As an alternative, the integrator block could also be included in the processing unit 22, but in that case the sample rate of the A/D converter must be raised to be equal to the pulse repetition frequency $rf_{rx}$ of the system.

Each sweep of the IF signal, received by the processing unit 22, are subjected to Fourier transformation during a time $T_{ft}$, preferably having a width equal to twice the pulse width $\tau$. Note that, as mentioned above, the IF signal represents an expanded time scale, so according to eq. 5 above, the actual window width becomes:

$$T_{ft} = 2\tau \frac{\Delta f}{(f_{prftx} - \Delta f)}$$

Figure 7:
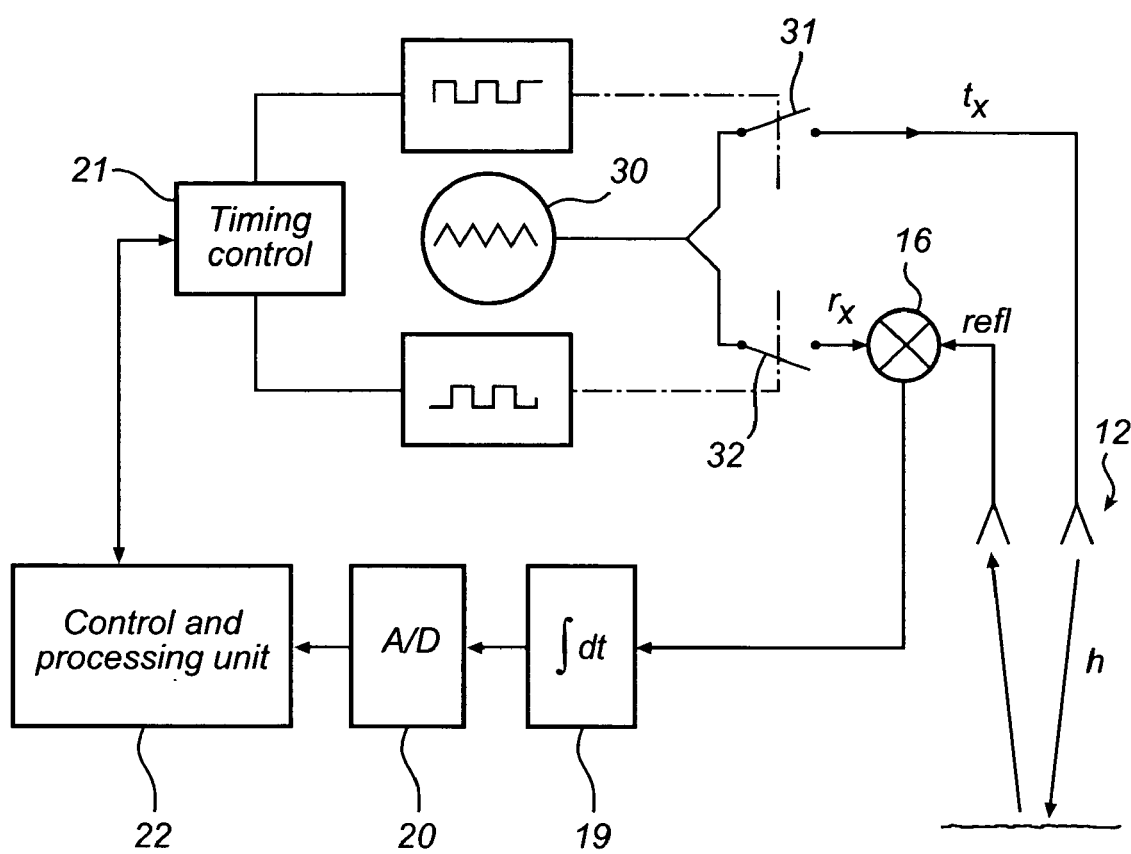
FIG. 7 is a block diagram of a pulsed radar level gauging system according to yet another embodiment of the present invention.

The Fourier transform results in a phase spectrum as indicated in FIG. 7. In principle, this spectrum will be similar to that illustrated in FIG. 3. However, as a consequence of the time expansion, the slope k determined in this spectrum will be related to the actual time delay, $\delta_{shift}$, by the factor in eq. 5, according to:

$$\delta_{shift} = \frac{\Delta f}{(f_{prftx} - \Delta f)} \cdot k$$

The beginning of the window $T_{ft}$, i.e. the beginning of the Fourier transform $t_0$, described above in relation to FIG. 2, should of course be selected such that the Fourier transform includes the reflected echo. This can be ensured in various ways. For example, the amplitude of the digitized tank signal can be monitored in the processor, and the Fourier transform initiated when the amplitude exceeds a predefined threshold, i.e. when an echo is detected. Alternatively, the Fourier transform can be performed continuously in a sliding manner, i.e. for the most recent available time window $T_{ft}$. The amplitude spectrum can be analyzed to determine when it includes an echo, and when this is the case, the phase spectrum can be analyzed as outlined above.

In principle, any relative time delay or phase shift in the signal IF is related to the beginning of the measurement cycle, i.e. to point 33 in FIG. 5 where the tx and rx pulses coincide. However, as described above, in order to enable an accurate level gauging, the measurement must be related to a known reference, ensuring alignment of the timescale of the measurement cycle with the actual geometry of the tank.

Therefore, a detected pulse corresponding to a surface echo is typically related to a reference pulse 32, i.e. a reflection created by a structure in a known position, such as a precisely located transition between two different wave guiding mediums.

When the reference pulse 32 is an echo close to the transmitter, it will typically occur within the first period of the IF signal, and in that case the phase delay $k_{ref}$ of the reference pulse, and thus its time delay, $t_{ref}$, can be determined directly from the Fourier spectrum as outlined above. This point in time, $t_{ref}$, can then be used as a starting point for a determination of a total time delay, or time of flight, for the surface echo.

The surface echo will typically be at a distance from $t_{ref}$ corresponding to a time significantly larger than the period of the IF signal. At the same time, the relative phase obtained from the Fourier spectrum is by definition modulus $2\pi$, i.e. it can only provide the final contribution of the total time delay. Therefore, in order to determine the complete time delay, the relative time $T_{rel}$ between the position $t_{ref}$ of the reference pulse and the beginning of the Fourier transform window, $t_0$, should be tracked, and added to the time delay obtained from the Fourier analysis. This results in a total time delay, or time of flight, between the reference pulse and the surface echo, $$\delta_{echo} = t_{echo} - t_{ref} = T_{rel} + \delta_{shift}$$

The relative time $T_{rel}$ can be obtained in various ways. One simple way is to count the number of samples from the A/D converter before the Fourier spectrum is calculated.

Figure 6:
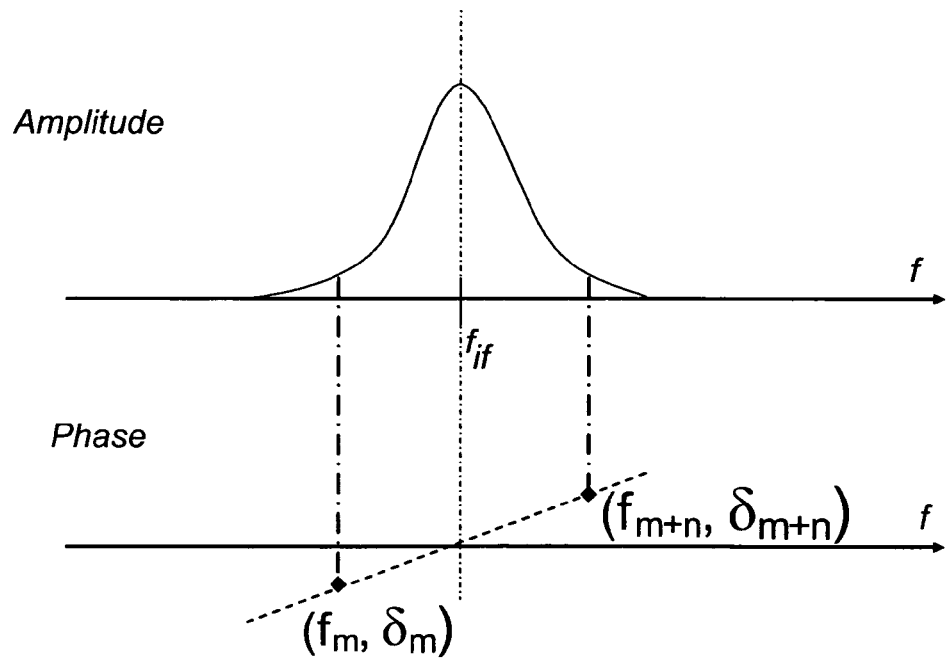
FIG. 6 is a phase spectrum of two signals obtained with a system according to FIG. 4.

An FFT transformation comprises a calculation for each specific frequency, in order to generate the entire spectrum (amplitude or phase). However, as the phase delay in the present embodiment is expected to be linear with respect to frequency, it is sufficient to calculate the Fourier transform for two frequencies in order to determine the slope k. This has been illustrated in FIG. 6, where the phase, $\phi_m$ and $\phi_{m+n}$ has been indicated for two frequencies, $\omega_m$ and $\omega_{m+n}$. The entire linear phase spectrum can now be approximated with a line through these two points, and its slope k can be determined as $(\phi_{m+n} - \phi_m)/(\omega_{m+n} - \omega_m)$. The two selected frequencies should be adequately spaced in time.

Another embodiment of the present invention utilizes the design illustrated in FIG. 7, where elements similar to the elements in FIG. 4 have been given identical reference numbers. Here, both transmitted signal tx and reference signal rx are derived from one continuous wave generator. The system in FIG. 7 has only one RF modulator 30, providing a continuous wave CW. The pulse generators 10, 13 are connected to switches ($S_{tx}$ and $S_{rx}$) 31, 32, adapted to and form/cut out pulses from the CW signal. The pulse generators are controlled by the timing control 21 in a way similar as was described in relation to FIG. 2, in order to achieve $rf_{tx}$ and $rf_{rx}$ signals as described earlier. However, as the same oscillator is used to generate both pulse trains, the system in FIG. 3 is, contrary to the system in FIG. 2, fully phase coherent.

The skilled person realizes that the embodiments described herein with reference to FIGS. 4 and 7 merely are two implementations of the more general concept defined in FIG. 2. The objective of the oscillator(s) and pulse generators is to generate to identical pulse trains with a linearly increasing time delay. The embodiment in FIG. 4 has the advantage of first generating the pulse timing, and then modulating the pulses. The embodiment in FIG. 7 has the advantage of using only one oscillator, thereby avoiding problems with jitter and incoherency.

Other ways to implement the model in FIG. 2 may be devised. For example, various other wave forms may be employed, as well as more complex frequency modulation. Several of the elements in the herein describe embodiments are only examples, and may be substituted based on the specific implementation.

What is claimed is:

1. A method for determining a process variable of a product in a tank based on a time delay of electromagnetic waves propagating between a predefined reference and a surface of said product, said method comprising:
generating a transmission signal in the form of a first pulse train,
generating a reference signal in the form of a second pulse train,
wherein each pulse in said first and second pulse trains has an essentially identical waveform,
pulses in said first and second pulse trains being delayed in relation to each other by a predefined and varying time delay,
guiding said transmission signal into the tank as electromagnetic waves, and allowing said waves to propagate towards said surface,
receiving a reflected signal reflected from the tank,
forming a measurement signal comprising a sequence of values, each value representing a time correlation between a pulse of the reference signal and the reflected signal, said measurement signal comprising at least one amplitude peak indicating a surface echo,
sampling and digitizing said measurement signal to form a digital signal,
identifying a time window of said digital signal including said surface echo peak,
determining a relative time period between a reference time corresponding to said predefined reference and a beginning of said time window,
time-to-frequency transforming said digital signal in said time window to obtain a phase spectrum,
determining a relative phase shift of said spectrum and using said relative phase shift to calculate a corresponding time shift, and
determining said time delay by adding said relative time period and said time shift.

2. The method according to claim 1, wherein said predefined and varying time delay increases linearly for each pulse in said first and second pulse trains.

3. The method according to claim 1, wherein said time window is selected as a time window for which an amplitude spectrum of a time to frequency transform is indicative of a surface echo.

4. The method according to claim 1, wherein an amplitude of said digitized signal is detected, and said time window is selected based on whether said amplitude exceeds a predefined threshold.

5. The method according to claim 1, wherein said reference time is determined based on an echo from said predefined reference.

6. The method according to claim 1, wherein said time window is equal to two pulse periods in the time scale of the measurement signal.

7. The method according to claim 1, wherein said time-to-frequency transform is a discrete Fourier transform.

8. The method according to claim 1, wherein said relative phase shift is determined by calculating two phase-frequency pairs, each such pair comprising a phase of the time to frequency transform for a specific frequency, and determining a rate of phase change with respect to frequency between said phase-frequency pairs.

9. The method according to claim 1, wherein
said first pulse train has a first pulse repetition frequency,
said second pulse train has a second pulse repetition frequency, said first and second pulse repetition frequencies being separated by a known difference frequency,
the time correlation between said reflected signal and said reference signal being such that said measurement signal represents a time expansion of one pulse of the transmission signal.

10. The method according to claim 1, wherein said measurement signal is formed by generating an output pulse for each pulse of the reference signal, each output pulse being equal to a time correlation of said reference pulse and said reflected signal, and setting the current level of a continuous signal in accordance with said output pulse.

11. A radar level gauge for determining a process variable of a content in a tank based on a time delay of electromagnetic waves propagating between a predefined reference and a surface of said product, said radar level gauge comprising:
a first transmitter for transmitting an transmission signal in the form of a first pulse train,
a second transmitter for transmitting a reference signal in the form of a second pulse train,
each pulse in said first and second pulse trains having an essentially identical waveform, and pulses in said first and second pulse trains being delayed in relation to each other by a predefined and varying time delay,
a propagation device for guiding said transmission signal as electromagnetic waves into the tank, and allowing said waves to propagate towards said surface,
a receiver for receiving a reflected signal reflected in said tank,
a mixer connected to said reflected signal and to said reference signal, and adapted to generate values of a measurement signal, each value representing a time correlation between a pulse of the reference signal and the reflected signal, said measurement signal comprising at least one amplitude peak indicating a surface echo,
an analogue to digital converter for sampling and digitizing said measurement signal, to form a digital signal,
processing circuitry arranged to identify a time window of said digital signal including said surface echo peak, determine a relative time period between a reference time corresponding to said predefined reference and a beginning of said time window, time-to-frequency transform said digital signal in said time window to obtain a phase spectrum, determine a relative phase shift of said spectrum and using said relative phase shift to calculate a corresponding time shift, and determine said time delay by adding said relative time period and said time shift.

12. The radar level gauge according to claim 11, wherein said first and second transmitter each comprise a pulse generator for generating a pulse train, and an oscillator for modulating said pulse train with a predefined carrier frequency.

13. The radar level gauge according to claim 12, further comprising a timing control for controlling the pulse repetition frequency of each pulse generator.

14. The radar level gauge according to claim 12, wherein the pulse repetition frequencies of said pulse generators are separated by a known difference frequency, thereby causing a linearly increasing time delay between the pulse in said first and second pulse train, respectively.

15. The radar level gauge according to claim 11, wherein said first transmitter comprises a pulse generator for generating said first pulse train, and a switch for connecting a first signal line to an oscillator during each pulse in said first pulse train, said oscillator providing a predefined carrier frequency, and wherein said second transmitter comprises a pulse generator for generating said second pulse train, and a switch for connecting a second signal line to said oscillator during each pulse in said second pulse train.

16. The radar level gauge according to claim 11, wherein said mixer is arranged to provide an output pulse for each pulse of the reference signal, each output pulse being equal to a time correlation of said reference pulse and said reflected signal.

17. The radar level gauge according to claim 16, further comprising a sample-and-hold circuit adapted to receive said output pulses from said mixer and provide a continuous output which, at every given moment, is equal to the latest output pulse from the mixer, said continuous output being used as said measurement signal.

18. The radar level gauge according to claim 11, wherein said propagation device comprises at least one of a probe for guided wave transmission of said electromagnetic waves, an antenna for free propagation of said electromagnetic waves, and a hollow waveguide for guided propagation of said electromagnetic waves.

* * * * *